Nov. 4, 1969  G. B. JEFFERY  3,477,047
ROTARY SWITCHES
Filed May 22, 1967  4 Sheets-Sheet 1
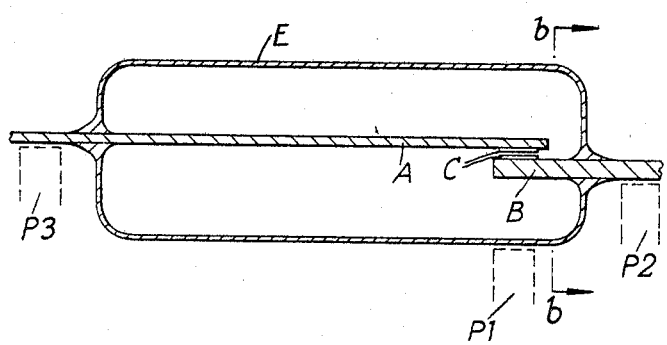
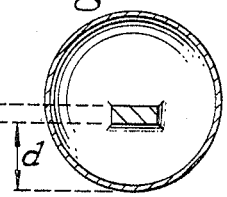
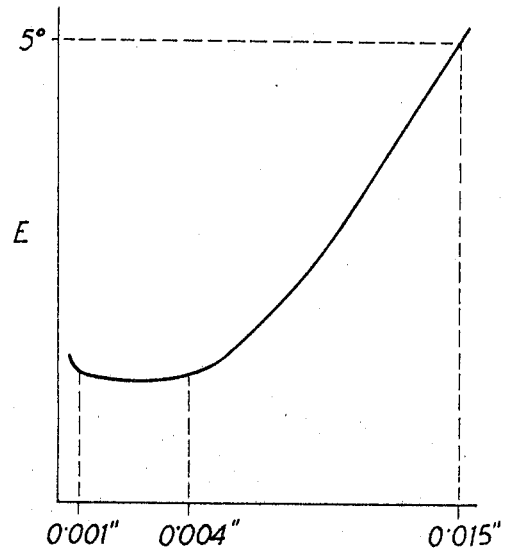
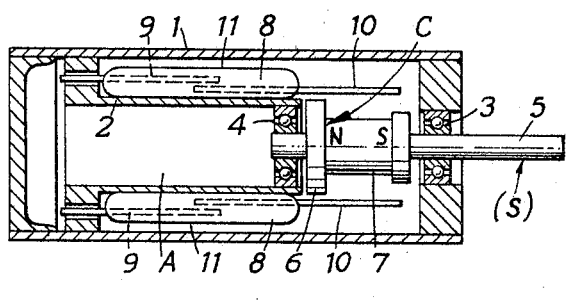
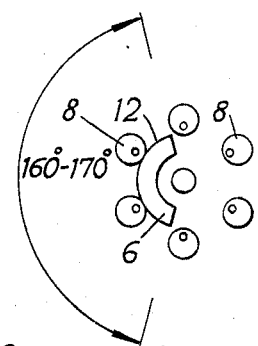

Nov. 4, 1969  G. B. JEFFERY  3,477,047
ROTARY SWITCHES
Filed May 22, 1967  4 Sheets-Sheet 2

Glynn Bennett Jeffery,
By Wendworth, Lind & Ponack, Attys

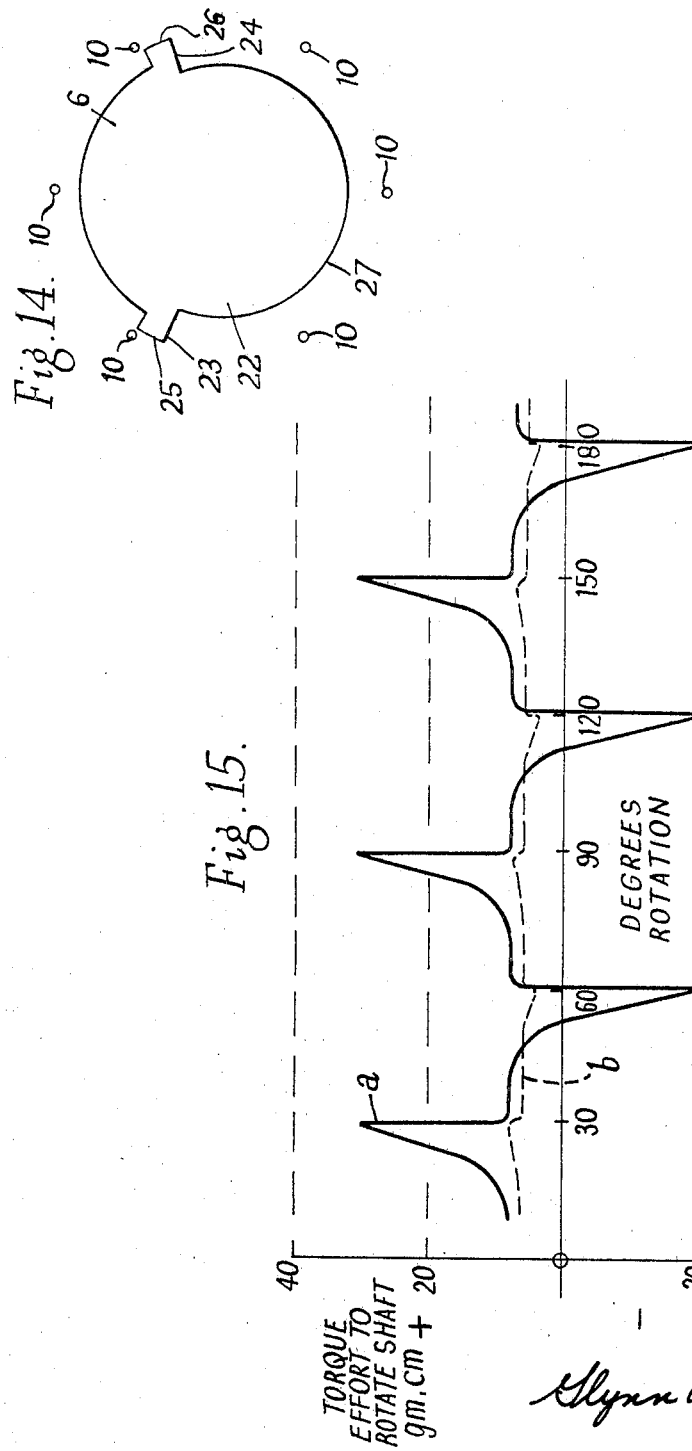

3,477,047
ROTARY SWITCHES
Glynn Bennett Jeffery, Woodbury 2, Warren Road,
Shenfield, England
Filed May 22, 1967, Ser. No. 640,092
Claims priority, application Great Britain, Sept. 22, 1966,
42,416/66; Sept. 26, 1966, 42,938/66
Int. Cl. H01h 9/00
U.S. Cl. 335—206                                       13 Claims

ABSTRACT OF THE DISCLOSURE

A rotary switch comprising a housing, a shaft rotatably mounted in the housing, a projection of magnetic material mounted to rotate with the shaft about the axis thereof, being displaced from the axis, and having a summit with respect to which the projection rises and recedes abruptly so that sharp steps are presented thereby in the direction of rotation, a magnetic reed switch mounted in the housing and having a fixed part of one magnetic member extending closely adjacent the path of said summit, and means for magnetising the projection.

---

The invention relates to rotary switches for generating pulses of accurately determined length, particular application being found, for example, in a transmitter for a three-phase stepping motor arrangement.

The invention utilises one or more magnetic reed switches. A switch of this kind is herein defined as comprising two magnetic members each having a contact portion, the members being mounted relative to each other in such a way that the contact portions make and break contact with each other by a bending of at least one of the members, said bending being effected by fluxes induced in the magnetic members from an externally applied magnetic field. A cylindrical envelope (usually of glass) is provided to enclose the members at least over the contact portions.

Rotary switches have been proposed which use magnetic reed switches, the external magnetic field being applied by a magnet which is mounted to rotate and in doing so to pass by the envelope and induce the necessary fluxes in the magnetic members. Such switches have the limitation that their angular accuracy (the point of actual operation of the switch with respect to the nominal angular position of the magnet at which the switch should operate) is poor. It is an object of the present invention to improve the angular accuracy of a rotary switch using one or more magnetic reed switches.

According to the invention there is provided a rotary switch comprising a housing, a shaft rotatably mounted in the housing, a projection of magnetic material mounted to rotate with the shaft about the axis thereof, being displaced from the axis, and having a summit with respect to which the projection rises and recedes abruptly so that sharp steps are presented thereby in the direction of rotation, a magnetic reed switch mounted in the housing and having a fixed part of one magnetic member extending closely adjacent the path of said summit substantially closer than the normal envelope would permit the projection to approach any part of a magnetic member within the envelope, and means magnetically coupled to said projection for magnetising the projection in a unipolar manner, whereby the magnetic reed switch is subjected to a unidirectional magnetic field which changes only in intensity as the shaft is rotated. As used in this context the term "fixed part of one magnetic member" is to be construed as including within its scope a fixed magnetic extension of the magnetic member proper.

Thus, in accordance with the invention it is ensured that where the projection passes it the part of the magnetic member or extension thereof is fixed, thereby obviating errors due to bending of the magnetic member at that point. Furthermore, it is arranged that the part of the magnetic member or extension thereof lies closely adjacent the path of the summit of the projection, it having been found that this enhances the accuracy of the switch. As used in this context "closely adjacent" means substantially closer than the normal envelope would permit the projection to approach any part of a magnetic member within the envelope. Although it is envisaged that the normal envelope may be suitably modified (as, for example, by pinching the end where one of the members emerges therefrom or indenting the envelope) it is preferred that the projection be arranged to pass the part of the magnetic member or extension thereof at a place outside the envelope.

By way of illustration of what is meant by the foregoing, reference is directed to FIGURES 1 and 2 of the accompanying drawings, of which:

FIGURE 1(a) is a sectional front elevation of a magnetic reed switch and FIGURE 1(b) is a sectional side elevation taken on line b—b of FIGURE 1(a); and FIGURE 2 is a graph illustrating experimental results which have been determined using a reed switch as shown in FIGURE 1.

Referring to FIGURE 1 the reed switch comprises two members A, B of magnetic material having cooperating contact portions C thereon. The two members are sealed into the ends of a glass envelope E from which at least the oxygen has been exhausted. Member A is, in the kind of switch shown in this figure, appreciably longer than member B and making and breaking of contact portions C is effected by bending of member A caused by an externally applied magnetic field which induces opposite magnetic poles at the overlapping ends of members A and B. In the kind of switch illustrated (but not in every kind of reed switch to which the invention is applicable) the bending of member B is insignificant.

FIGURE 1(b) shows a sectional view of the switch taken on line b—b of FIGURE 1(a). The dimension $t$, the smallest dimension of member B, is 0.025" and the dimension $d$ is 0.080". It will be seen, therefore, that if the external magnetic field is induced by a magnet rotatable about an axis parallel to the switch axis, the nearest the magnet can come to either magnetic member is of the order of 0.080" if the magnet is arranged to pass close to the envelope at a position illustrated, for example, at P1, where the field of the magnet influences both members A and B directly. If, however, the position of the magnet is moved to P2 or P3 it can be made to come closely adjacent the respective magnetic member A or B, although only one member is then being directly influenced by the field.

Experiments have shown that by situating the magnet so that it comes closely adjacent a fixed part of a magnetic member, the angular accuracy of the switch is enhanced without any appreciable adverse effects on the switching action itself. FIGURE 2 is a graph in which angular accuracy is plotted as the ordinate against an abscissa of clearance of the magnet from the member A or B when in a position such as P2 or P3. The angular accuracy is plotted in terms of the angular tolerance of the switch position in which the required switching can be expected. Thus it will be seen that at clearances between 0.001" and 0.004" the accuracy is very good and reasonably level whereas thereafter the accuracy falls off until at a clearance of 0.015" the accuracy corresponds to a tolerance of some 5°, which is about the maximum which can be tolerated in applications such as stepping motor transmitters, for which the invention is intended.

Preferably, in the above recited arrangement in accordance with the invention, the summit of the projection has a part-cylindrical surface coaxial with the shaft, the surface receding abruptly away from the cylindrical at its ends. The projection may project radially outwardly with respect to the shaft axis, radially inwardly from an annular portion of a support member fixed on the shaft; in a direction parallel to the shaft axis; or in a direction having components in the aforesaid directions.

The accuracy of the switching action depends on the abruptness of the steps presented by the projection. When the projection is adjacent the magnetic member or extension thereof flux is induced therein by the projection to close the switch. The switch opens again when the airgap to the projection exceeds a predetermined limit. Thus the sharper said steps presented by the projection the more positive is the switching action. The projection may be so shaped that said steps are so sharp as to be undercut with respect to the summit. The switching accuracy is enhanced even further if the magnetic member or extension thereof itself presents sharp steps as seen by the projection in rotating. Thus, in a preferred embodiment of the invention the wire-like magnetic member is fitted with a magnetic shoe which projects towards said path and which presents sharply rising and receding faces to the projection as it passes. A similar effect may be achieved by suitably bending one of the magnetic members so that a prescribed length of it lies closely adjacent the path of projection summit. By arranging for the bend or bends to be sharp the necessary rapid change in air-gap is enhanced. The ability of the magnetic members to be bent allows the body of the reed switch to assume any desired disposition relative to the shaft.

The means for magnetising the projection may comprise a permanent magnet mounted axially on the shaft in contact with the projection or an electromagnet wound about the shaft with one end near the projection. Alternatively the shaft or the projection itself may be a permanent magnet.

For optimum efficiency in practice the part of the magnetic member adjacent the path of the summit is arranged to be as close as is practicable to the path without actually touching the projection as it passes. There may be provided a body of magnetic material mounted to rotate with the shaft about the axis thereof and spaced apart from the projection in the direction of the shaft axis, another part of one of the magnetic members or a magnetic extension thereof extending closely adjacent the peripheral path of the body, there being provided means for magnetising the body. The body may be a disc coaxially mounted on the shaft or may be a projection similar to the first, being in angular registration therewith. With this arrangement the means for magnetising the projection and the body may be a permanent magnet extending therebetween at the shaft axis and having one pole in contact with the projection and the other pole in contact with the body.

In its application to stepping motor transmitters the switch according to the invention preferably comprises a plurality of magnetic reed switches each having a fixed part of one magnetic member or a fixed magnetic extension thereof arranged as aforesaid, the fixed parts or extensions being distributed around the path of the summit of the projection. For three-phase operation there are six magnetic reed switches and the or each part-cylindrical summit surface covers an arc of 150–170°. Conveniently the switches are interconnected in such a way that for each pair of diametrically opposed switches a connector connects together one terminal from each switch, the three connectors constituting the three phase terminals, and of the remaining terminals of each said switch pair one is connected to positive potential and the other to negative potential, the arrangement being such that around the circle positive and negative potentials are connected alternately.

According to a further feature of the invention the arrangement is such that, as the shaft rotates after the switch contacts have made under the influence of the magnetic projection, the projection is effectively withdrawn a distance which still allows the contacts to be held in the made condition.

The withdrawal may be physical withdrawal of the projection or, if the means for magnetising the projection comprises and electromagnet, effective withdrawal may be made by reduction of the current flowing in the electromagnet winding. Preferably, however, the withdrawal is made by virtue of a cutaway portion of the projection after, having regard to the direction of rotation of the shaft, the leading end of the projection. In a preferred embodiment of the invention both the leading and trailing ends of the projection are upstanding relative to the cutaway portion therebetween.

The feature of the invention whereby the projection is effectively withdrawn when the switch contacts have made so that the magnetic flux through the reed switch is reduced to a low "holding" level substantially less than the level of flux required to "make" the contacts has the advantage that the torque required to turn the shaft is substantially reduced. For example, in a rotary switch having six reed switches and arranged for three-phase operation as a stepping switch the operating torque required my be reduced from a peak value of 30 gm.-cm. to a value of the order of 5 gm.-cm.

The invention will further be described hereinafter with reference to FIGURES 3 to 15 of the accompanying drawings of which:

FIGURE 3 is a sectioned side elevation of a stepping motor transmitter embodying the invention;

FIGURE 4 is an end elevation illustrating the disposition of the reed switches and the projection of magnetic material;

Figure 10:
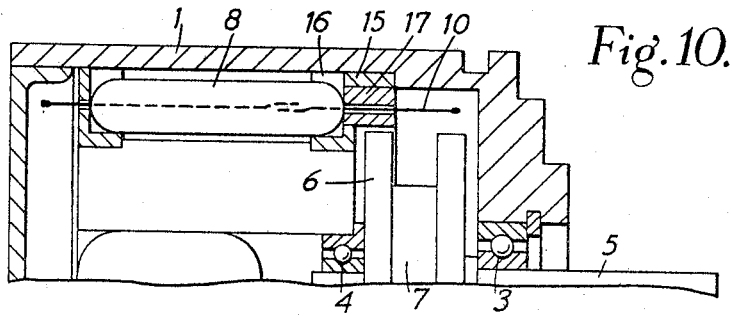
FIGURE 10 is a sectioned side elevation of one half of another stepping motor transmitter embodying the invention.
Figure 11A:
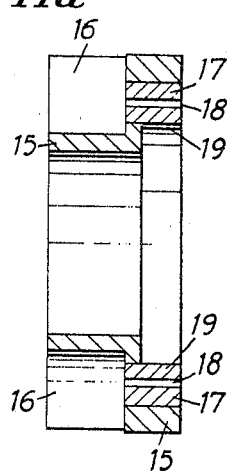
Figure 11B:
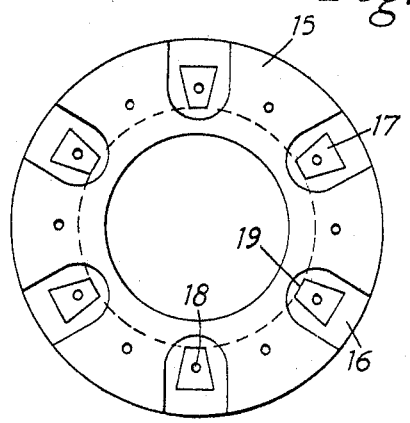
Figure 12A:
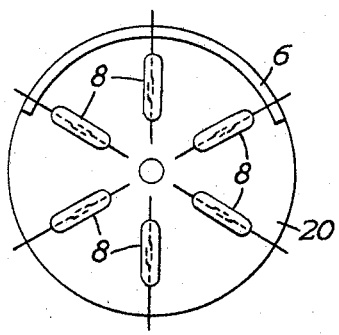
Figure 12B:
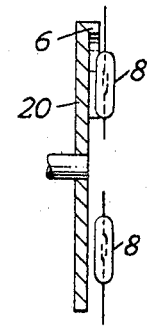
Figure 13:
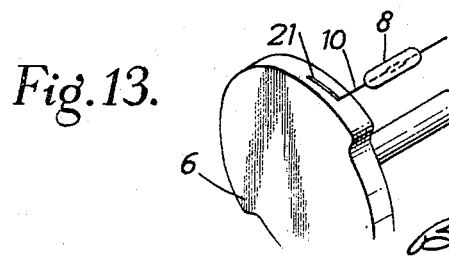

FIGURES 11(a) and 11(b) are, respectively, a sectional side elevation and end elevation of the support piece of FIGURE 10;

FIGURES 12(a) and 12(b) are diagrams illustrating in end elevation and sectioned side elevation an alternative form of switch in accordance with the invention;

FIGURE 13 is a schematic end elevation of a further switch in accordance with the invention;

FIGURE 14 is a schematic end elevation of a further switch in accordance with the invention; and FIGURE 15 is a graph of operating torque against angular displacement for the switch of FIGURE 14.

Referring to FIGURE 3 the transmitter comprises a cylindrical housing 1 within which is coaxially mounted a cylindrical inner housing 2. The end of the housing 1 and of the inner housing 2 carry bearings 3 and 4 respectively in which is mounted a shaft 5 having an outwardly projecting end by which it may be rotated by any convenient mechanical means. The inner end of shaft 5 carries a body of magnetic material with a projection 6 which is magnetised by contact with a permanent bar magnet 7 mounted on shaft 5 coaxially therewith. Projection 6 has an external summit surface 12 (as can be seen from FIGURE 4) which is part cylindrical, extending over an arc of some 165°.

In the annular space between housing 1 and the inner housing 2 there are mounted six magnetic reed switches 8 each comprising two straight resilient magnetic members 9 and 10 sealed in a glass envelope 11. The arrangement is such that members 10 are parallel to the axis of shaft 5 and are evenly distributed in a circle closely circumscribing the path of the outer surface of projection 6. The arrangement is such that when the summit surface of projection 6 is adjacent one of the magnetic members 10 there is induced in the respective reed switch sufficient magnetic flux to attract together members 9 and 10 and thereby connect them electrically.

FIGURE 4 shows the distribution of the reed switches around the axis of shaft 5 and illustrates the operational shape of projection 6. The surface 12 is arranged to come as close as is practicable to members 10 without actually touching them. For practical purposes the clearance is of the order of 0.001–0.002 inch. With this arrangement it is found that very precise and angularly consistent operation of the magnetic switches can be obtained.

Figure 5:
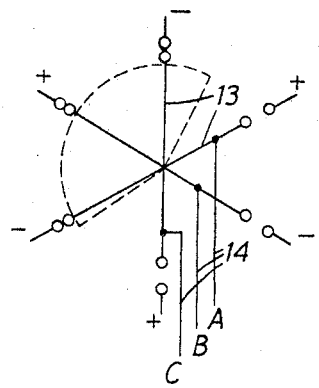
FIGURE 5 is a diagram illustrating the wiring of the reed switches.

FIGURE 5 illustrates the way in which the magnetic switches are connected to provide the required three phase characteristic as shaft 5 is continuously rotated. In each pair of diametrically opposed switches a connector 13 connects together one terminal from each switch. The three connections 13 constitute respectively the three output phases of the transmitter and are connected to respective lines 14. Of the remaining terminals of each pair of switches one is connected to positive potential and the other to negative potential, the arrangement being such that around the circle positive and negative potentials are connected alternately.

This arrangement provides on the respective phase lines (designated A, B and C) the following cyclic potentials:

| Lines A | + | + | + | + | I | − | − | − | − | I | + |
|---|---|---|---|---|---|---|---|---|---|---|---|
| B | − | − | I | + | + | + | + | + | I | − | − |
| C | I | − | − | − | − | − | I | + | + | + | + | wherein I designates isolation of the respective line. This characteristic is suitable for a stepping motor having 12 discrete positions in response to twelve positions of the shaft of the transmitter.

Figure 6:
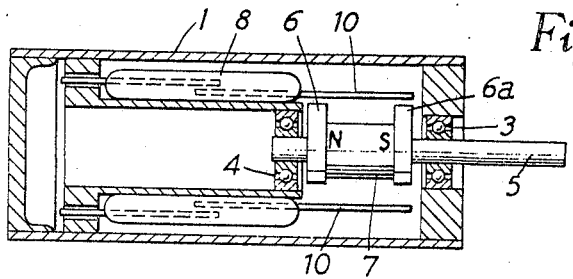
FIGURES 6 to 9 are sectional side elevations of other stepping motor transmitters embodying the invention.

FIGURE 6 shows a further embodiment of the invention, being a stepping motor transmitter exactly similar to that described with reference to the foregoing figures except that there is provided at the end of magnet 7 remote from projection 6 a body of magnetic material which has a projection 6a. The two projections are precisely similar, 6a subtending the same angle and being in angular registration with projection 6. The arrangement is such that on rotation the outer surface 12a of projection 6a comes as close to the projecting ends of members 10 as possible without actually touching them.

Figure 7:
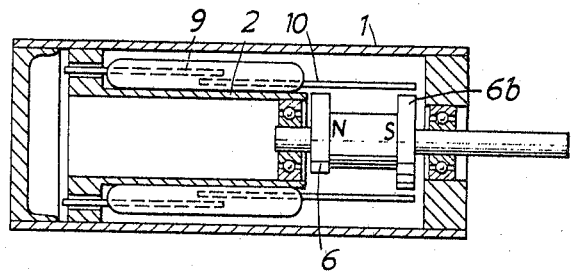

The body need not be exactly similar to the projection but may be constituted by a uniform disc of magnetic material. Such an arrangement is shown in FIGURE 7, where 6b is the disc. Furthermore, in another embodiment of the invention, shown in FIGURE 8, the body shown at 6c, is positioned so that its peripheral path passes closely adjacent the other magnetic member 9 of each reed switch. Shaft 5 extends through the housing from one end of the housing to the other, bearing 4 being replaced by a bearing 4a at the end of the housing remote from bearing 3. A permanent magnet 7b extends between the projection and the body, the inner housing 2 constituting a magnetic shield between the magnet 7b and the reed switches.

Figure 8:
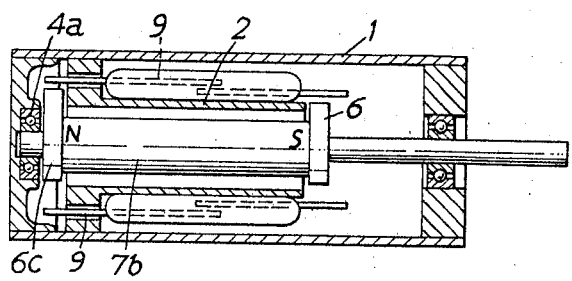
Figure 9:
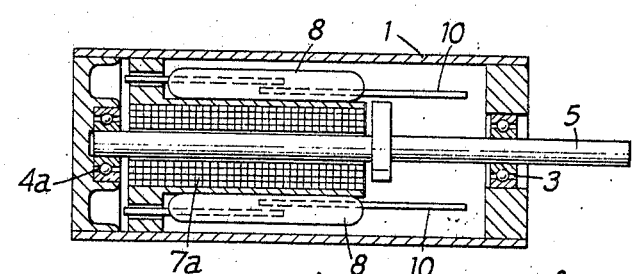

In FIGURE 9 there is shown a stepping motor transmitter which differs from that shown in FIGURE 3 in that, as in FIGURE 8, shaft 5 extends the full length of housing 1, bearing 4 being replaced by a bearing 4a on the end wall of the housing. Furthermore, permanent magnet 7 or 7b is replaced by an electromagnet 7a, the coil being wound to surround shaft 5.

Referring to FIGURE 10 there is shown the upper half of a sectioned side elevation of a stepping motor transmitter of similar general configuration to that shown in FIGURE 3. An outer housing 1 carries six magnetic reed switches 8 and has a shaft 5 mounted axially in bearings 3 and 4. A body of magnetic material with a projection 6 is mounted on the shaft and magnetised by a permanent magnet 7. The principal difference over the FIGURE 3 arrangement is in the provision of an annular support piece 15, in which the ends of the reed switches are mounted, members 10 passing therethrough. As can be seen from FIGURES 11(a) and 11(b) the support piece is basically cylindrical with a cylindrical passage therethrough. The support piece is made of an epoxy resin and has six recesses 16 in the outer circumference extending from one and partly along the length of the support piece. At the end of each recess 16 a channel is provided which accommodates a shoe 17 of magnetic material. Each shoe has a hole 18 therethrough.

The shoes 17 have appropriately profiled inner faces 19 which lie on a circle closely circumscribing the path of the outer surface 12 of projection 6. The reed switches 8 each have one end supported in a recess 16, member 10 passing through hole 18, being a contacting fit therein. With this arrangement shoes 17 act as magnetic extensions of members 10, the positions of which extensions are accurately determined and held with respect to the path of the surface 12.

FIGURES 12(a) and 12(b) show an embodiment of the invention in which the projection 6 projects from a disc-like support 20 in a direction parallel to the shaft axis. The reed switches 8 are arranged radially with respect to the shaft axis and this arrangement gives a flat, disc-like form of switch. FIGURE 12a is an end elevation and FIGURE 12b a sectioned side elevation illustrating the relative disposition of the parts mentioned.

FIGURE 13 shows schematically in perspective a further embodiment of the invention in which the reed switches 8 (only one of which is shown) lie parallel to the shaft axis and have member 10 bent at right angles and curved over a predetermined length at its end 21 to conform closely to the path of projection 6. In this way is achieved a similar effect to the provision of a shoe 17 (FIGURES 10 and 11).

FIGURE 14 shows schematically the end elevation of a rotary switch employing the feature of the invention whereby the "holding" magnetic flux passed through the reed switches is appreciably less than flux required to "make" the contacts thereof. In this embodiment a disc 22 of magnetic material has a projection 6 extending over an arc of some 165°. The ends 23 and 24 of the projection present sharp steps to and from summit surfaces 25 and 26, respectively. Projection 6 is permanently magnetised and the arrangement is such that over the arc 27 not occupied by projection 6 the disc 22 is spaced from the magnetic members 10 by a gap which is too wide to allow sufficient flux to pass to the magnetic reed switches to operate them, or even hold them operated if they happen to be operated. Thus, whenever the arc 27 is adjacent a particular switch, the switch contacts are open.

When the disc 22 is rotated so that the surface 25 or surface 26 is adjacent the appropriate magnetic member 10, then the gap is closed sufficiently for the magnetic reed switch to be operated. Thereafter, the switch will remain operated even though the flux passing thereto be reduced. Accordingly, the major part of projection 6—about 125° in arc—is cut away to a radius between the radius of surface 25 and 26 and that of arc 27. The extent to which the projection is cut away is sufficient to maintain the magnetic reed switches against which the projection 6 is adjacent operated.

The advantage of such an arrangement is that the torque necessary to rotate the disc 22 is substantially less than that necessary to rotate the disc if the whole surface of projection 6 is of the same radius as surfaces 25 and 26. A comparison is shown in FIGURE 15, which is a graph relating torque to angular displacement of the disc 22. The graph is plotted for a total displacement of 180° and a shows the torque characteristic when projection 6 is not cut away whereas b shows the characteristic when projection 6 is cut away as shown in FIGURE 14.

Two improvements are apparent. Firstly, the maximum torque for curve b is of the order of 5 gm. cm. as compared with a maximum for curve a of the order of 30 gm. cm. Secondly, the unevenness of torque distribution around the cycle is considerably less for curve b than for curve a.

In any of the above embodiments of the invention the projection 6 may be allowed to brush the members 10 or shoes 17 in passing, providing that one or both of the contacting portions has an insulating layer of varnish, nlyon or the like. Alternatively, in order to prevent electrical conduction through the body of magnetic material it may be made of ferrite.

The invention is not restricted to the details of the foregoing description made with reference to the accompanying drawing. For example the switching arrangement in accordance with the invention is equally suitable for operating a single reed switch since it provides an effective and simple method of obtaining an angularly consistent switching characteristic for generating pulses. Furthermore, it is possible to modify the arangement shown in the drawings by changing the number of magnetic reed switches and/or the angle of the arc of the projection surface to render it suitable for operation for systems requiring a different number of phases or a different number of repetition cycles per revolution.

In addition, it is envisaged that the envelope or envelopes of the reed switches may be so modified as to include within one envelope all the reed switches. The single envelope may be annular to accommodate the shaft and magnet assembly. The envelope may be filled with an inert atmosphere, such as nitrogen or helium.

I claim:
1. A rotary switch comprising a housing, a shaft rotatably mounted in the housing, a projection of magnetic material mounted to rotate with the shaft about the axis thereof and being offset from the axis, and having a summit with respect to which the surface of the projection rises and recedes abruptly so that sharp steps are presented thereby in the direction of rotation, at least one magnetic reed switch mounted in the housing and having an envelope and a fixed part of one magnetic member extending outside the envelope closely adjacent the path of said sumit substantially closer than the normal envelope would permit the projection to approach any part of a magnetic member within the envelope, and means magnetically coupled to said projection for magnetising the projection in a unipolar manner, whereby the magnetic reed switch is subjected to a unidirectional magnetic field which changes only in intensity as the shaft is rotated.

2. A switch as claimed in claim 1, wherein said summit has a part cylindrical surface coaxial with the shaft, the surface receding abruptly away from the cylindrical at its ends.

3. A switch as claimed in claim 1, wherein said magnetizing means comprises a body of magnetic material mounted to rotate with the shaft about the axis thereof and spaced apart from the projection in the direction of the shaft axis, another part of one of the magnetic members extending closely adjacent the peripheral path of the body, there being provided means for magnetising the body.

4. A switch as claimed in claim 3 wherein the body is a disc coaxially mounted on the shaft.

5. A switch as claimed in claim 3 wherein the body is a projection similar to said first mentioned projection, being in angular registration therewith.

6. A switch as claimed in claim 4 wherein the means for magnetising the projection and the body is a permanent magnet extending therebetween at the shaft axis and having one pole in contact with the projection and the other pole in contact with the body.

7. A switch as claimed in claim 1 and constituting a stepping motor transmitter, there being provided a plurality of magnetic reed switches each having a fixed part of one magnetic member extending closely adjacent the peripheral path of the projection, said parts of said magnetic members being distributed around said path.

8. A switch as claimed in claim 1 wherein there are six magnetic reed switches disposed to be affected in turn by the projection as the shaft rotates and the summit has a part cylindrical surface coaxial with the shaft and covering an arc of 150°–170°, the surface receding abruptly away from the cylindrical at its ends.

9. A switch as claimed in claim 8 for three phase operation wherein the magnetic reed switches are evenly distributed around the shaft and interconnected so that in each pair of diametrically opposed switches a connector connects together one terminal from each switch, the three connectors constituting the three phase terminals; and of the remaining terminals of each said switch pair one is connected to possitive potential and the other to negative potential, the arrangement being such that around the circle positive and negative potentials are connected alternately.

10. A switch as claimed in claim 1 wherein the summit of the or each projection is provided with a thin layer of electrical insulation, the arrangement being such that the insulation comes into contact with said fixed part or extension of the or each magnetic member as it passes.

11. A switch as claimed in claim 1 wherein, as the shaft rotates after the switch contacts have made under the influence of the magnetic projection, said projection has a portion projecting less than the leading portion, taken with respect to the direction of rotation, the spacing between said less projecting portion and the magnetic member is still sufficient for the contacts to be held in the made condition.

12. A switch as claimed in claim 11 wherein the said less projecting portion is cut-away portion of the projection after the leading end of the projection.

13. A switch as claimed in claim 12 wherein both the leading and trailing ends of the projection project more than the cutaway portion therebetween.

References Cited

UNITED STATES PATENTS

| | | | |
|---|---|---|---|
| 2,740,860 | 4/1956 | Walsh | 335—205 |
| 3,158,710 | 11/1964 | Raglee. | |
| 3,291,109 | 12/1966 | Neapolitakis. | |
| 3,359,455 | 12/1967 | Koda et al. | 335—205 X |
| 3,375,812 | 4/1968 | Koda. | |

BERNARD A. GILHEANY, Primary Examiner

R. N. ENVALL, Jr., Assistant Examiner

U.S. Cl. X.R.

335—207